United States Patent
Oteri et al.

(10) Patent No.: US 12,004,182 B2
(45) Date of Patent: Jun. 4, 2024

(54) UPDATING SCHEDULE OF MULTIPLE COMMUNICATIONS

(71) Applicant: Apple Inc., Cupertino, CA (US)

(72) Inventors: Oghenekome Oteri, San Diego, CA (US); Chunhai Yao, Beijing (CN); Chunxuan Ye, San Diego, CA (US); Dawei Zhang, Saratoga, CA (US); Haitong Sun, Irvine, CA (US); Hong He, Cupertino, CA (US); Huaning Niu, San Jose, CA (US); Seyed Ali Akbar Fakoorian, San Diego, CA (US); Sigen Ye, Whitehouse Station, NJ (US); Wei Zeng, San Diego, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 318 days.

(21) Appl. No.: 17/438,929

(22) PCT Filed: Jan. 14, 2021

(86) PCT No.: PCT/CN2021/071657
§ 371 (c)(1),
(2) Date: Sep. 13, 2021

(87) PCT Pub. No.: WO2022/151123
PCT Pub. Date: Jul. 21, 2022

(65) Prior Publication Data
US 2022/0361217 A1    Nov. 10, 2022

(51) Int. Cl.
*H04W 72/04* (2023.01)
*H04W 72/12* (2023.01)
(Continued)

(52) U.S. Cl.
CPC .......... *H04W 72/23* (2023.01); *H04W 72/21* (2023.01)

(58) Field of Classification Search
None
See application file for complete search history.

(56) References Cited

U.S. PATENT DOCUMENTS

| 10,750,491 B2 | 8/2020 | Talarico et al. |
| 2010/0056079 A1* | 3/2010 | Onggosanusi ........ H04L 1/1887 455/95 |

(Continued)

FOREIGN PATENT DOCUMENTS

| CN | 102158976 A | 8/2011 | |
| WO | WO-2012136109 A1 * | 10/2012 | ........ H04W 72/1289 |
| WO | 2020103316 A1 | 5/2020 | |

OTHER PUBLICATIONS

International Search Report for PCT Patent Application No. PCT/CN2021/071657; dated Oct. 15, 2021.

*Primary Examiner* — Sai Aung
(74) *Attorney, Agent, or Firm* — Kowert, Hood, Munyon, Rankin & Goetzel, P.C.

(57) ABSTRACT

This disclosure relates to techniques for performing wireless communications including schedules for multiple communications between a user equipment device (UE) and a base station. Techniques for updating such schedules are disclosed. The update may be explicitly signaled or may be determined implicitly. The UE and the base station may perform communications according to the updated schedule.

18 Claims, 10 Drawing Sheets

(51) Int. Cl.
*H04W 72/21* (2023.01)
*H04W 72/23* (2023.01)
*H04W 76/11* (2018.01)

(56) References Cited

U.S. PATENT DOCUMENTS

| | | | |
|---|---|---|---|
| 2015/0016310 A1* | 1/2015 | Yi | H04L 1/1671 370/277 |
| 2015/0092647 A1* | 4/2015 | Tabet | H04W 28/0221 370/311 |
| 2016/0020875 A1* | 1/2016 | Seo | H04L 5/0092 370/280 |
| 2017/0171841 A1 | 6/2017 | Chen et al. | |
| 2020/0186301 A1* | 6/2020 | Nunome | H04W 72/23 |
| 2020/0196346 A1 | 6/2020 | Khoshneviasan et al. | |
| 2020/0266919 A1 | 8/2020 | Khoshneviasan et al. | |
| 2021/0329671 A1* | 10/2021 | Kim | H04W 72/0453 |

\* cited by examiner

Common fields

| Identifier for DCI formats |
| --- |
| Carrier indicator |
| Bandwidth part indicator |
| Modulation and coding scheme |
| TPC command for scheduled PUSCH |
| Precoding information and number layers |
| Antenna ports |
| PTRS-DMRS association |
| beta_offset_indicator |
| DMRS sequence initialization |
| HARQ process number |
| Time-Domain RA |

Slot-specific fields

| SRS resource indicator |
| --- |
| SRS request |
| CSI request |
| 1st downlink assignment index |
| 2nd downlink assignment index |

HARQ process ID signaled in the DCI may apply to the first scheduled PUSCH. HARQ process may then be incremented by 1 for subsequent PUSCHs in the scheduled order (with modulo operation as needed)

At least support continuous time domain resource assignment with Type A and Type B PUSCHs.

FIG. 6

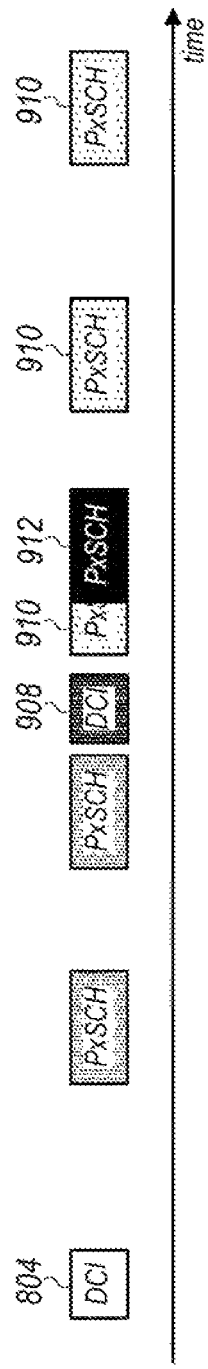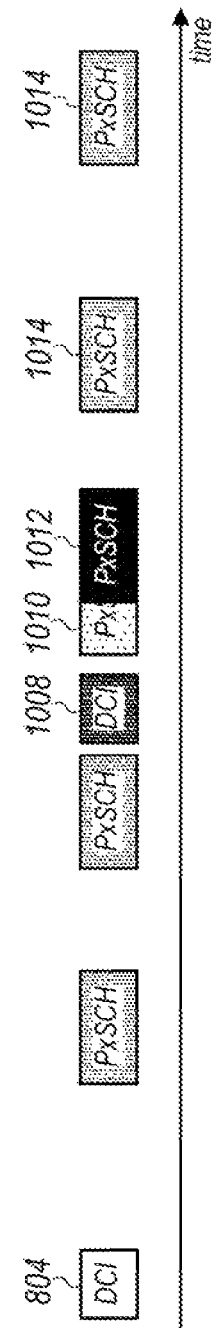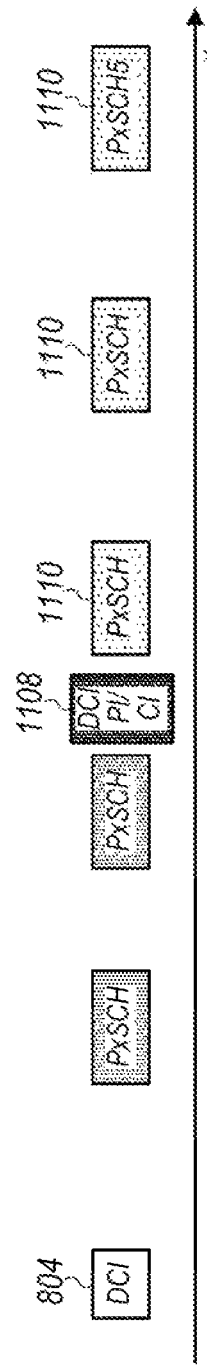

UPDATING SCHEDULE OF MULTIPLE COMMUNICATIONS

PRIORITY CLAIM INFORMATION

This application is a national stage application of International Application No. PCT/CN2021/071657, filed on Jan. 14, 2021, titled "Updating Schedule of Multiple Communications", which is hereby incorporated by reference in its entirety.

TECHNICAL FIELD

The present application relates to wireless communication, including to updating schedules of multiple communications.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost, low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One characteristic may be series of multiple communications. Improvements in the field are desired.

SUMMARY

Embodiments are presented herein of, inter alia, systems, apparatuses, and methods for updating a schedule of multiple communications in a wireless communication system.

As noted above, the number of use cases for wireless networks communicating with different classes of user equipment devices (UEs) with widely variable capabilities and usage expectations are growing. One direction in expansion of possible use cases supported by wireless communication techniques may include increasing use of techniques for scheduling multiple communications, e.g., multiple physical uplink share channel (PUSCH) and/or physical downlink share channel (PDSCH) transmissions (e.g., multi-PxSCH). A multi-PxSCH transmission schedule may be updated (e.g., modified) by explicit signaling from a base station to a UE and/or implicitly, e.g., based on information available to both the UE and base station. Accordingly, the techniques described herein include techniques for a UE and base station to perform such updates.

For example, a UE may establish communication with a base station. The base station may provide control and/or configuration information to the UE. The base station may transmit scheduling information to the UE to schedule multi-PxSCH transmissions. The UE may determine a first schedule, e.g., based on the scheduling information. The UE and base station may or may not perform communications according to the first schedule. The UE and base station may determine an updated schedule. The base station may explicitly indicate the updated schedule to the UE. Alternatively, the base station and the UE may determine the updated schedule independently, e.g., based on other information such as an acknowledgement communication or knowledge of an invalid subframe, among various possibilities. The UE and the base station may perform communication according to the updated schedule.

The techniques described herein may be implemented in and/or used with a number of different types of devices, including but not limited to mobile telephones or smart phones (e.g., iPhone™, Android™-based phones), tablet computers (e.g., iPad™, Samsung Galaxy™) portable gaming devices (e.g., Nintendo DS™, PlayStation Portable™, Gameboy Advance™ iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 5-7 illustrate aspects of multi-PxSCH scheduling, according to some embodiments;

FIGS. 9-16 illustrate aspects of updating a multi-PxSCH schedule, according to some embodiments.

Figure 1:
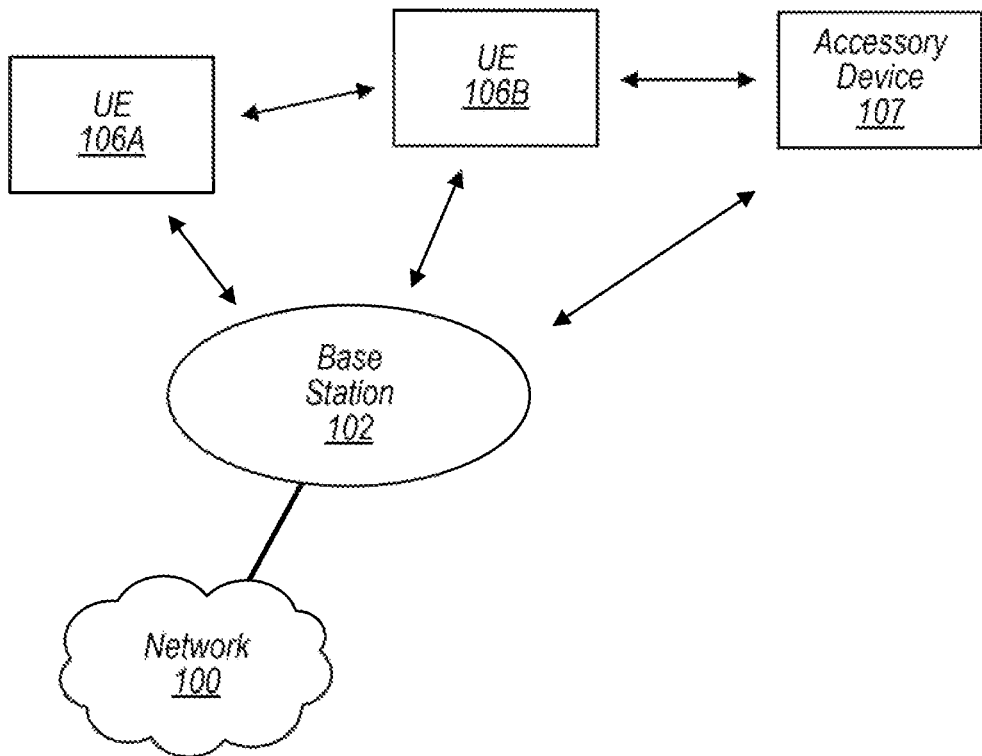
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
RRC: Radio Resource Control
MAC: Media Access Control
CE: Control Element
Tx: Transmission (or transmit)
Rx: Reception (or receive)
RS: Reference Signal
CSI: Channel State Information
PDCP: packet data convergence protocol
RLC: radio link control

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
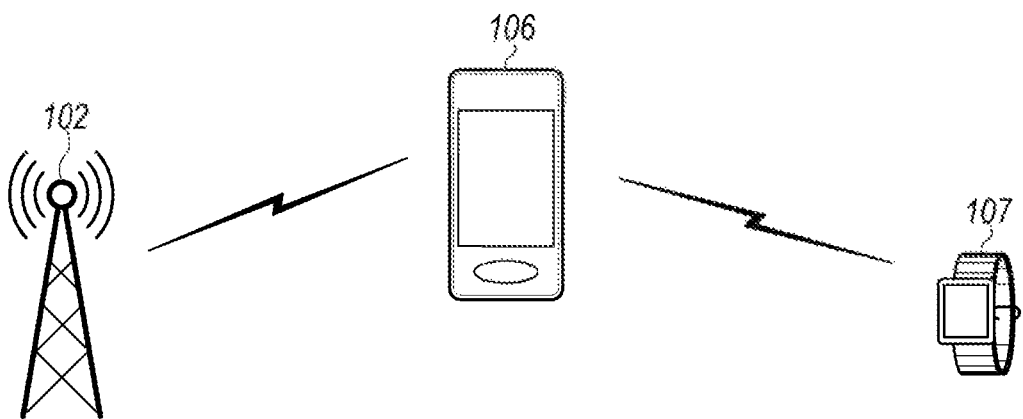
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1xRTT, 1xEV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

The BS 102 may control one or more transmission and reception points (TRPs) and may use the TRPs to communicate with the UEs. The TRPs may be collocated with the BS and/or at separate physical locations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop, unmanned aerial vehicle (UAV), unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
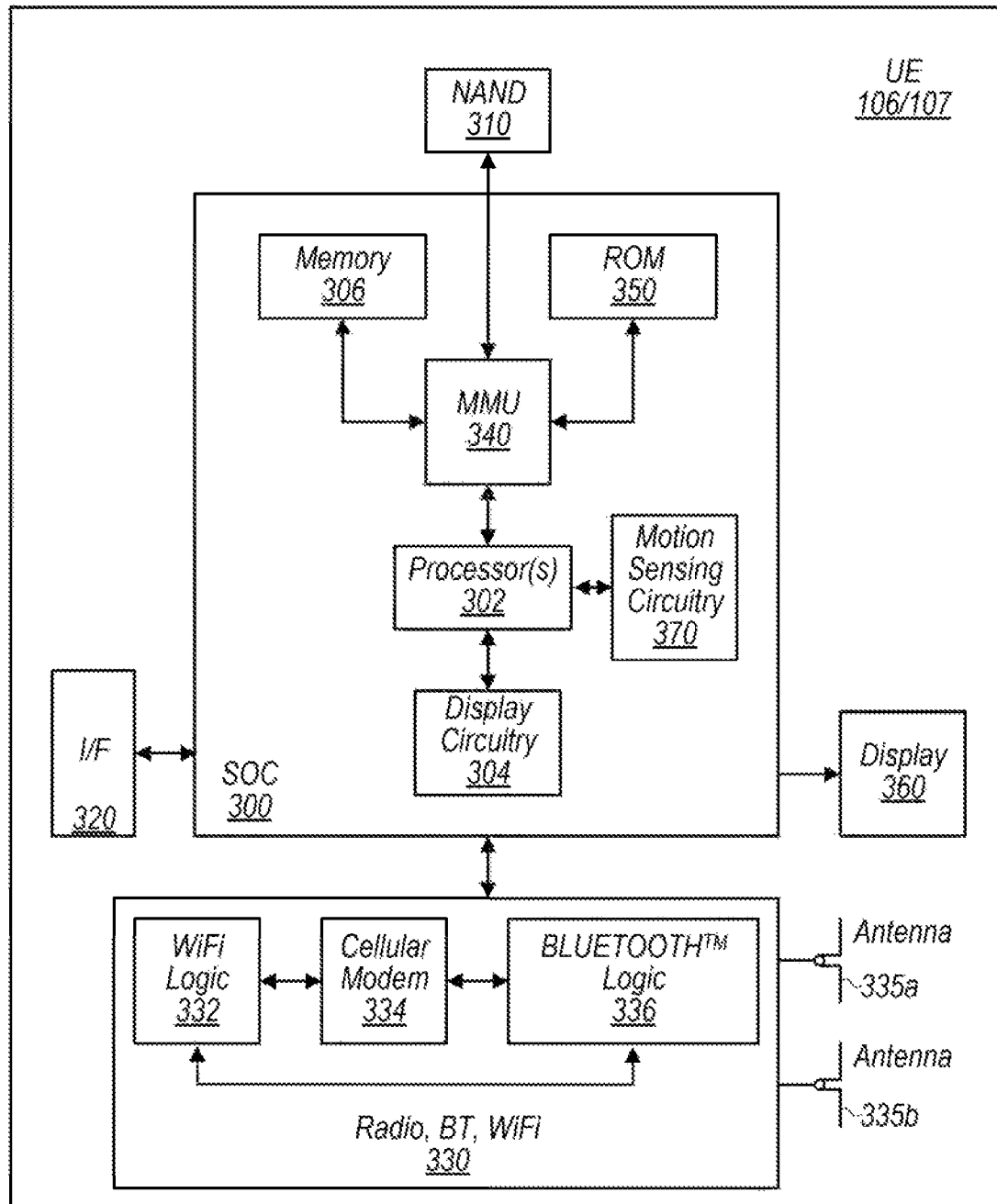
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
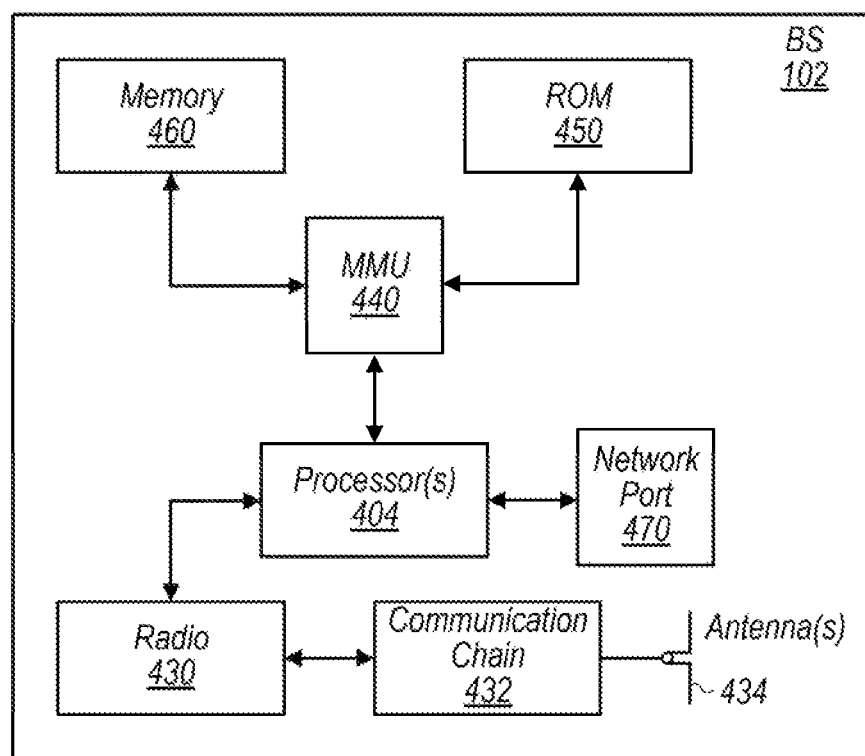
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Figure 5:
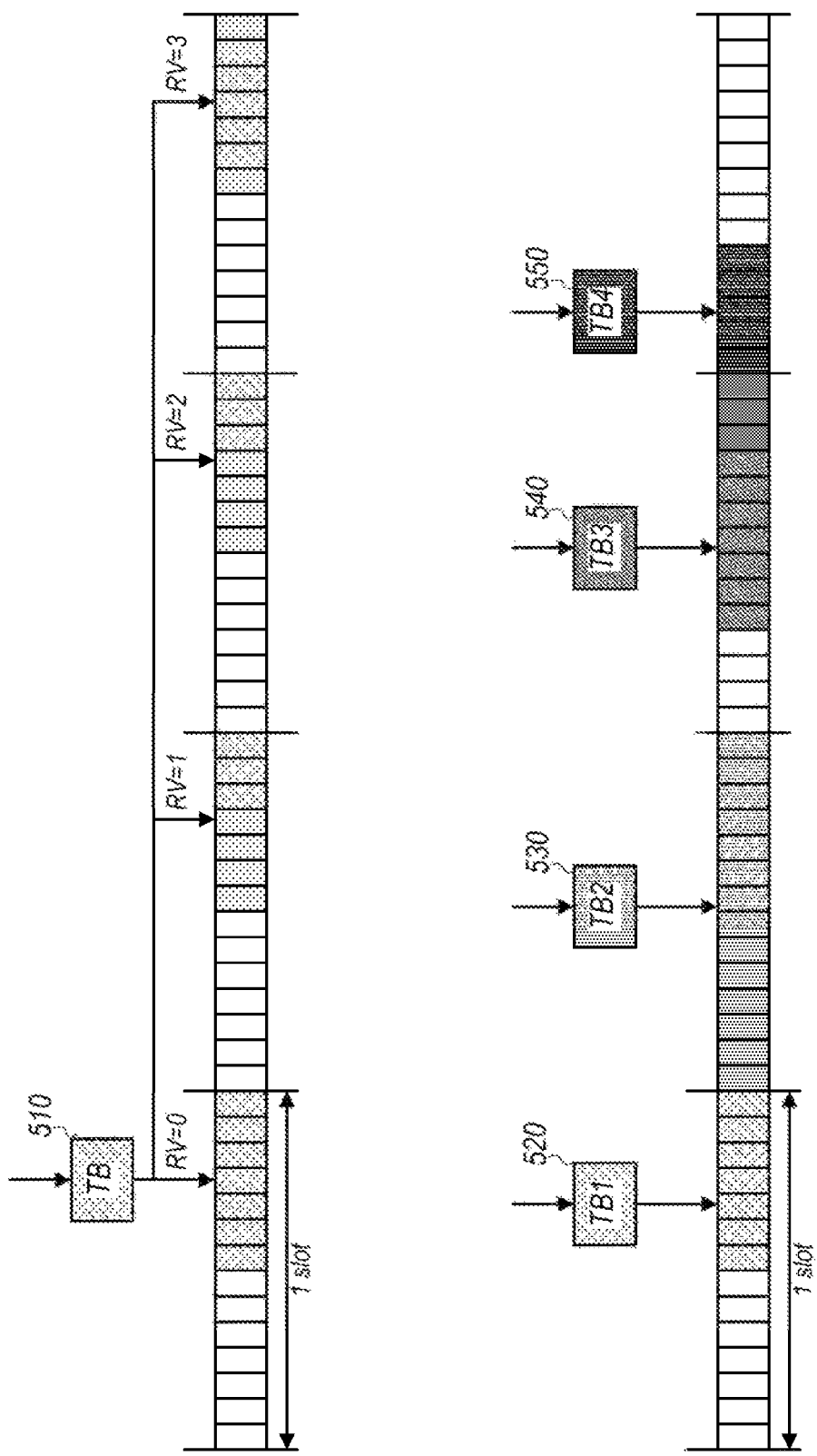
Figure 7:
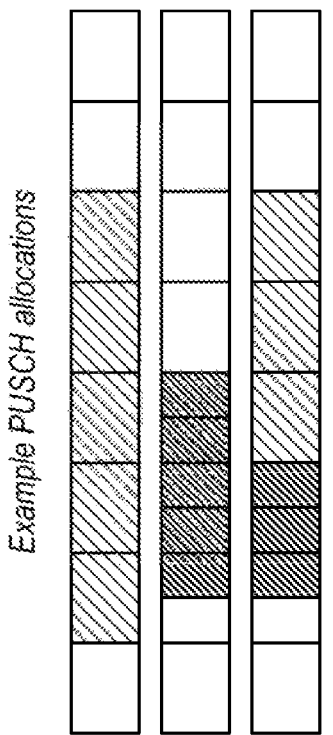

FIGS. 5-7—Scheduling Multiple Communications

Scheduling of multiple communications using a single scheduling message may allow for reduced overhead, e.g., relative to individual scheduling of the communications. Accordingly, wireless communications such as new radio (NR) and NR-unlicensed (NR-U) may support means of scheduling multiple uplink (UL) and/or downlink (DL) communications (e.g., to occur over a period of time) using a single scheduling message. For example, a base station may schedule multiple physical UL shared channel (PUSCH) and/or physical DL shared channel (PDSCH) transmissions (e.g., multi-PxSCH may refer to multiple UL and/or DL communications on the respective shared channels) together.

FIG. 5 illustrates examples of multi-PxSCH scheduling, according to some embodiments. As shown, in a first example, a PUSCH transmission transport block (TB) 510 may be scheduled to repeat in multiple transmission time intervals (e.g., multi-TTI PUSCH transmission). This repetition in time may support reliability (e.g., for ultra reliable low latency communication (URLLC) services or otherwise ensure UL coverage.

In a second example, multi-TTI PUSCH transmission may be used to schedule multiple slots and/or mini-slots with different TBs (e.g., 520, 530, 540, and 550) using a single UL grant. The TBs may be scheduled at aperiodic times. This may allow for higher efficiency. For example, in unlicensed spectrum scheduling the TBs sequentially may allow for increased UL transmissions probability, e.g., because other users may not occupy the spectrum between transmissions.

FIG. 6 illustrates various fields that may be used to schedule a multi-PxSCH transmission. For example, the illustrated fields may be included in an information element or other message for time domain resource allocation (TDRA), such as: pusch-TimeDomainAllocationListForMultiPUS CH, and/or PUSCHTimeDomainResourceAllocationList-r16, among various possibilities. Such fields may be used to configure a TDRA table for multi-PxSCH scheduling.

FIG. 7 illustrates a TDRA table for multi-PxSCH scheduling, according to some embodiments. As shown, a plurality of TDRA index values may be configured with various parameters. The parameters may include various K values (e.g., a delay between a first communication such as DCI scheduling a multi-PxSCH communication and a related communication such as the first communication of the schedule, e.g., measured in slots; K0 may be for PDSCH, K1 may be for the delay between PDSCH and HARQ/PUCCH, and K2 may be for PUSCH), S (e.g., the symbol at which a particular communication starts), L (e.g., the length of each communication, e.g., in symbols), and mapping type. S and L may be referred to as start and length indicator value (SLIV). Additional or different fields may be included as desired. Further the time units may be different, etc.

In some embodiments, multi-TTI PxSCH scheduling may use DCI format 0_1. The TDRA table configuration may allow indicating single or multiple continuous PxSCHs in any slot of the multiple scheduled slots.

In some embodiments, a maximum number of PxSCH in a row may be set. For example, such a maximum may be 8, among various possibilities.

In some embodiments, a number of new data indicator (NDI) bits and/or redundancy version (RV) bits in DCI format 0_t may be determined based on the configured TDRA table. For example, 1 RV bit per PxSCH may be used in case multiple PxSCHs are scheduled. The RV may be one value of {0,2}. 2 RV bits for the PxSCH may be used in case only a single PxSCH is scheduled.

In some embodiments, the TDRA table may be extended such that each row indicates multiple PxSCHs (e.g., continuous in time-domain). Each PxSCH may have a separate SLIV and mapping type. The number of scheduled PxSCHs may be signaled by the number of indicated valid SLIVs in the row of the TDRA table signaled in DCI.

Figure 8:
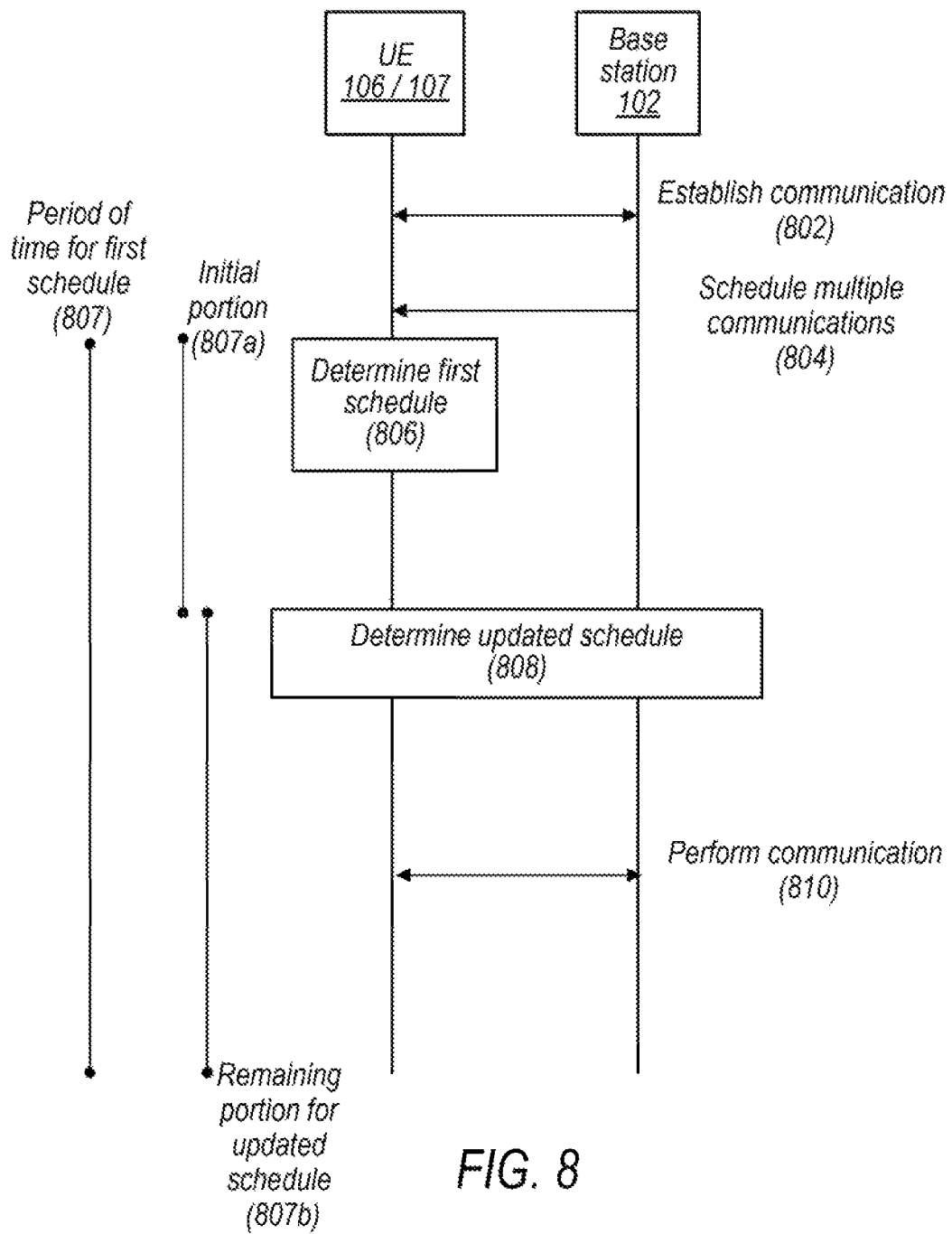
FIG. 8 is a communication flow diagram illustrating an example method for updating a multi-PxSCH communications schedule, according to some embodiments.

FIG. 8—Communication Flow Diagram

Under various circumstances, it may be useful to update (e.g., modify, cancel, or override, etc.) a schedule of multi-PxSCH transmissions after the transmissions are initially scheduled. For example, such an update may increase efficiency of communication, e.g., by skipping a repetition of a transmission that is successfully completed and positively acknowledged or to respond to changing communication priorities of the network and/or UE. Such an update may occur prior to a first communication of the schedule of multi-PxSCH communications, during a communication, or between communications of the schedule. In other words, such an update may occur at any time between a message initially setting the schedule and the completion of the schedule.

FIG. 8 is a communication flow diagram illustrating an example method for updating a schedule of multiple communications, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 8 may be implemented by a UE, such as the UEs 106 or 107, a cellular network, and/or one or more BS 102, e.g., as illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 430, or 432, processors associated with various core network elements, etc., among various possibilities) may cause a UE, network element, and/or BS to perform some or all of the illustrated method elements. Note that while at least some elements of the method of FIG. 8 are described in a manner relating to the use of communication techniques and/or features associated with LTE, NR, and/or 3GPP specification documents, such description is not intended to be limiting to the disclosure, and aspects of the method of FIG. 8 may be used in any suitable wireless communication system, as desired. As shown, the method may operate as follows.

The UE and the base station may establish communication (802), according to some embodiments. The UE and the base station may communicate using one or more radio access technologies (RATs), e.g., including NR. The UE and the base station may communicate using any frequency resources, e.g., including NR operations above 52.6 GHz, among various possibilities. The UE and the base station may communicate using one or more frequency carriers, e.g., including licensed and/or unlicensed carriers. The base station may provide one or more cell and/or cell groups and the communication between the UE and the base station may use one or more cell and/or cell group.

The base station may exchange configuration information with the UE. For example, the base station may use radio resource control (RRC) and/or other higher layer signaling to configure the UE. Among various possibilities, the configuration may include various parameters relevant to updating schedules of multi-PxSCH communications. In other words, the configuration may include information that facilitates future scheduling of multi-PxSCH communications and adjustments to such schedules.

For example, the configuration information may specify time division multiplexing (TDM) configuration(s) for communication between the UE and base station, e.g., indicating transmission directions for various time periods (e.g., slots, symbols, etc.). The configuration information may specify various time periods (e.g., slots, symbols, etc.) that are invalid for the UE (e.g., invalid symbols).

The configuration information may include multi-PxSCH communication configurations, such as a TDRA table or similar information. For example, the base station may configure the UE with a variety of TDRA indexes that may be used for scheduling multiple communications. For example, the TDRA indexes may indicate the direction and time (e.g., start and duration) of the multiple communications.

The UE and base station may use an acknowledged mode (AM) and/or unacknowledged mode (UM). For example, in an AM, transmissions may be positively acknowledged (ACK) and/or negatively acknowledged (NACK) using a hybrid automatic repeat request (HARQ) system. In UM, these transmissions may not be acknowledged (e.g., positively (ACK) and/or negatively (NACK)). For example, the network may configure the UE to use AM.

In some embodiments, the configuration information may indicate one or more implicit triggers for updating a schedule of communications. For example, such triggers may include conflicts between the schedule of communications and configuration information (e.g., a conflict between a TDM configuration and the schedule or a schedule including an invalid time period). As another example, such triggers may include HARQ acknowledgement, e.g., acknowledgement of a repeating transmission may be an implicit trigger to adjust the schedule to skip further repetitions of the transmission.

The configuration information may include parameters related to the timing of updating a schedule of communication. For example, the UE and base station may determine a processing delay, e.g., a minimum amount of time between an indication to update a schedule and update taking effect. Such a processing delay may be applied to explicitly and/or implicitly signaled updates. For example, a UE may not be expected to cancel or modify a TTI that is earlier than a defined processing time, e.g., a processing delay threshold. The processing delay time may be described as $tproc\_2+d\_i$, relative to the time of an indication to change a schedule.

The configuration information may include parameters related to HARQ acknowledgement in the case of an updated schedule. For example, the base station may configure the UE to perform HARQ acknowledgement according to an updated schedule or according to the schedule prior to the update.

The base station may determine a schedule of multiple communications and transmit an indication of the schedule to the UE (804), according to some embodiments. The schedule may be transmitted using lower layer signaling. For example, the base station may determine a multi-PxSCH communication schedule and transmit DL control information (DCI) to the UE to indicate the schedule. In some embodiments, the base station may use a media access control (MAC) control element (CE) to indicate the schedule.

The UE may receive the schedule from the base station and determine a first schedule (806), according to some embodiments. The first schedule may be the schedule indicated by the base station, e.g., in DCI. The first schedule may apply to a period of time (807).

In some embodiments, the UE and the base station may perform one or more communications according to the first schedule, e.g., during initial portion (807a) of the period of time (807). For example, the UE and the base station may perform UL and/or DL communication according to the first schedule. The UE and base station may transmit HARQ acknowledgements (e.g., ACK and/or NACK, as appropriate).

The UE and the base station may determine an updated schedule (808), according to some embodiments. The updated schedule may be determined at any point during the period of time (807). The updated schedule may apply to a remaining portion (807b) of the period of time (807).

In some embodiments, the updated schedule may also apply to a second period of time (e.g., for a further period of time after the end of 807).

In some embodiments, determining the update to the schedule may include the base station determining the updated schedule and transmitting (e.g., via DCI, MAC CE, and/or another signaling mechanism) an explicit indication of the update to the UE. FIGS. 9-13 (described further below) illustrate examples of such explicit indication, according to some embodiments.

Figure 14:
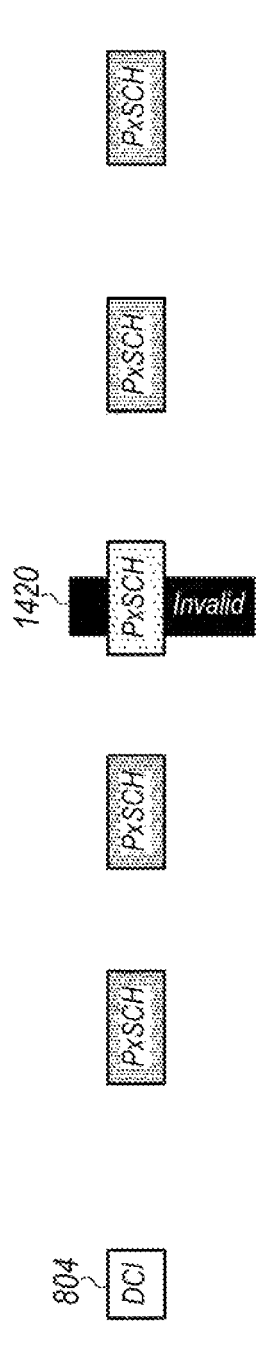
Figure 15:
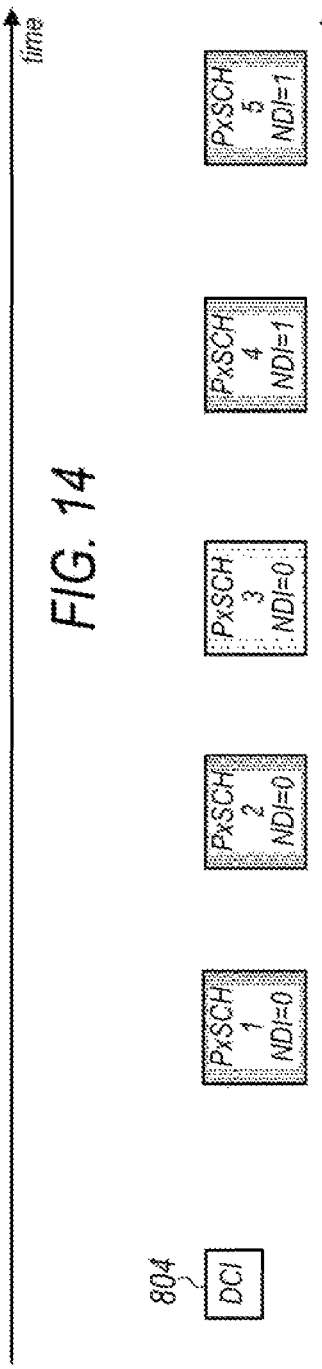
Figure 16:
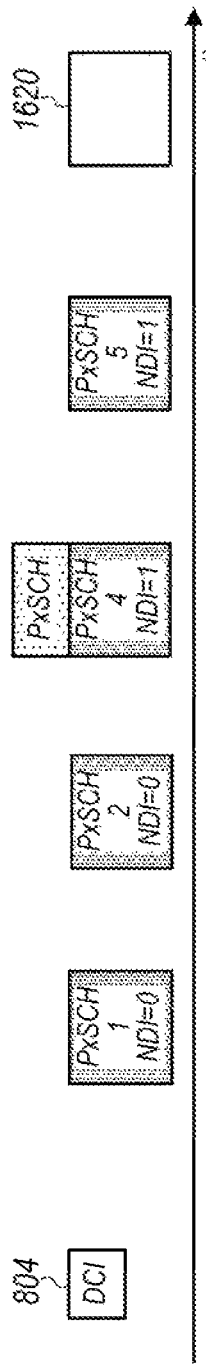

In some embodiments, the base station and the UE may determine the updated schedule without an explicit indication from the base station to the UE of the updated schedule. FIGS. 14-16 (described further below) illustrate examples of such implicit indication of the updated schedule, according to some embodiments.

Among various possibilities, the updated schedule may include: adding one or more communications (e.g., which were not part of the first schedule), cancelling some or all remaining communications according to the first schedule, adjusting the time of one or more communications relative to the first schedule, and/or adjusting parameters (e.g., modulation and coding scheme (MCS), etc.) of one or more communications relative to the first schedule.

The UE and the base station may communicate according to the updated schedule (810), according to some embodiments. For example, the UE and the base station may perform UL and/or DL communications, such as PUSCH and/or PDSCH communications according to the updated schedule. In some cases, communicating according to the updated schedule may not include performing any communications during a remaining portion of the period of time covered by the first schedule, e.g., because all remaining communications of the first schedule are cancelled and the updated schedule does not include any new communications.

The UE and the base station may exchange HARQ feedback for communications during the remaining period of time (807b) for the multiple communications subsequent to the schedule update, e.g., when using acknowledged mode. In some embodiments, for communications according to the updated schedule, HARQ feedback may be provided according to the first schedule. In other words, HARQ-ACK may be reported based on previous DCI (without termination/modification based on the updated schedule). In other words, the UE and the base station may transmit NACK for any communication cancelled by the updated schedule. For example, if a DL communication according to the first schedule is cancelled in the updated schedule, the UE may send a NACK for the communication (e.g., even though it is cancelled). This approach of using the first schedule for providing HARQ feedback may reduce or avoid the possibility of a HARQ-ACK mismatch, e.g., in the case that the UE misses an explicit or implicit indication to update the schedule.

In some embodiments, for communications according to the updated schedule, HARQ feedback may be provided according to the updated schedule. In other words, the UE and the base station may only transmit NACK for any communication in the updated schedule that is not received. This approach may offer lower overhead, but there may be potential HARQ-ACK mismatch issue.

In some embodiments, configuration information (e.g., described above in 802) may indicate whether to use the updated schedule or the first schedule for HARQ. In some embodiments, an explicit or implicit indication of which schedule to use for HARQ may be provided (e.g., at the time of determining the updated schedule, e.g., in 808, or anytime thereafter). For example, an explicit indication from the base station to use the first schedule or the updated schedule for HARQ may be transmitted with (or separately from) an explicit indication of an updated schedule (e.g., in 808).

FIGS. 9-13—Explicit Indication of Updated Schedule

As noted above, the base station may determine an updated schedule and transmit, to the UE, an explicit indication of the updated schedule. For example, explicit indication may be a DCI message. Various examples are shown in FIGS. 9-13.

It will be appreciated that such cancellation or modification of the schedule may occur only if the gap between the first symbol of the PxSCH and the last symbol of the updating/cancelation DCI is larger than a certain threshold (e.g., the processing delay). In other words, the remaining portion (807b) of the period of time may begin after the processing delay from the time of the explicit indication of the updated schedule, e.g., the updating/cancellation DCI.

As shown in FIG. 9, the base station may send a first DCI (804) scheduling a series of communications. The base station may later send a second DCI (908) explicitly indicating to cancel all remaining communications according to the first schedule (e.g., potentially after a configured processing delay), according to some embodiments. Thus, the DCI may act as an override. The base station may send DCI to override all future transmissions/receptions (910) in the first schedule. The DCI may further schedule one or more additional communications (912). On receipt of the DCI, the UE may cancel all future transmissions/receptions.

As shown in FIG. 10, the base station may send a DCI (1008) explicitly indicating to cancel or override a subset of remaining transmissions (1010) according to the first schedule (e.g., potentially after a configured processing delay), according to some embodiments. Other remaining transmissions (1014) may not be changed. In other words, remaining transmissions 1014 may be scheduled by the first DCI and the schedule of transmissions 1014 may not be changed (e.g., or indicated) bay the second DCI.

The subset of remaining transmissions to be cancelled may be explicitly or implicitly indicated. For example, the subset of transmissions may be explicitly indicated based on HARQ process number (HPN), scheduled time(s) of the transmission(s), and/or other characteristics (e.g., quality of service, flow, etc.). For example, the PxSCHs that are scheduled by a scheduling DCI (e.g., setting the first schedule) with 'HARQ process number=X' may be canceled by the UE in response to the updating/cancellation DCI. The value of X may be indicated by the updating/cancelation DCI format. Thus, any PxSCH transmission meeting the criteria (e.g., HPN=X) may be cancelled.

The subset of transmissions may be implicitly indicated, e.g., based on a relationship with new/modified transmissions (1012) scheduled by the DCI. For example, a DCI scheduling a new transmission(s) may override (e.g., cancel) any previously scheduled transmission(s) that overlaps (e.g., in time) the new transmission(s). Thus, based on an explicit indication of the new communication(s), the UE may cancel one or more previously scheduled transmission overlapping the new communication, e.g., without an explicit indication to cancel the previously scheduled transmission.

In some embodiments, one or more of the following field values maybe used to indicate that the updating/cancelation DCI cancels one or more transmissions, e.g., a modulation and coding scheme (MCS) field may be set to be all '1', RV may be set to all '0', a frequency domain resource allocation (FDRA) field may be set to all '0' for FDRA type 0 or FDRA may be set all '1' for FDRA type 1, among various possibilities.

As shown in FIG. 11, the base station may send a DL Preemption Indication (PI) or UL Cancellation Indication (CI) as the DCI (1108) for updating multi-PxSCH. For example, for early termination on DL, especially for the case of no further data is available for this UE, the base station may determine to release resources to other UEs. In order to do so, the base station may send a DLPI signal to the UE to cancel the PDSCH (1110) indicated by the signal. For UL, the base station may send an ULCI signal to cancel the PUSCH (1110) that is indicated in the signal. The UE may stop transmission/reception based on receipt of the signal (e.g., after any configured processing delay).

In some embodiments, the DLPI/ULCI signals can be sent as unicast DCIs that cancel specific TTI grants. Thus, they may be signaled in a UE specific Search Space (USS). Alternatively, they can be sent as Group Common (GC-DCI) with individual UE signaling.

In some embodiments, the DCI or cancellation signal may indicate that everything after the initial cancellation is cancelled, e.g., no resumption of the first schedule after cancellation.

As noted previously, the signal may explicitly indicate the communications of the first schedule that should or should not be cancelled or modified. One way to provide this indication may be a bitmap in the signal whose size may be determined by (a) the number of transmissions in the multi-PxSCH or (b) the maximum number of transmissions in the PxSCH. For example, a DLPI/ULCI (or other signal) may include a bitmap of bitesize equal to the maximum number of TTIs in the TDRA. Cancelled transmissions may be indicated in the bitmap by being set to zero and non-cancelled TTIs set to 1, or vice versa. Alternatively, the bit corresponding to the 1st PxSCH TTI that is (or is not) cancelled may be set to 1, e.g., indicating that PxSCH transmissions prior to the communication indicated by the 1 may not be cancelled and PxSCH transmissions subsequent to the communication indicated by the 1 may be cancelled.

Note that there may be no frequency component indicated in the bitmap, according to some embodiments.

In some embodiments, cross carrier indication of DLPI/ULCI (or other DCI or type of messaging for updating multi-PxSCH transmission) may be used. In other words, a control signal on one carrier may be used to update a multi-PxSCH schedule on another carrier. For example, if the first schedule applies to one carrier (e.g., unlicensed) a second carrier (e.g., licensed) may be used to indicate an updated schedule.

Figure 12:
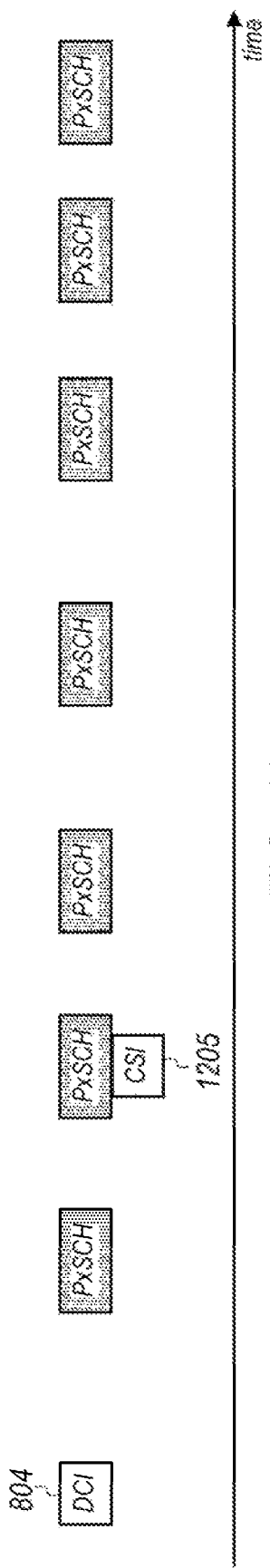
Figure 13:
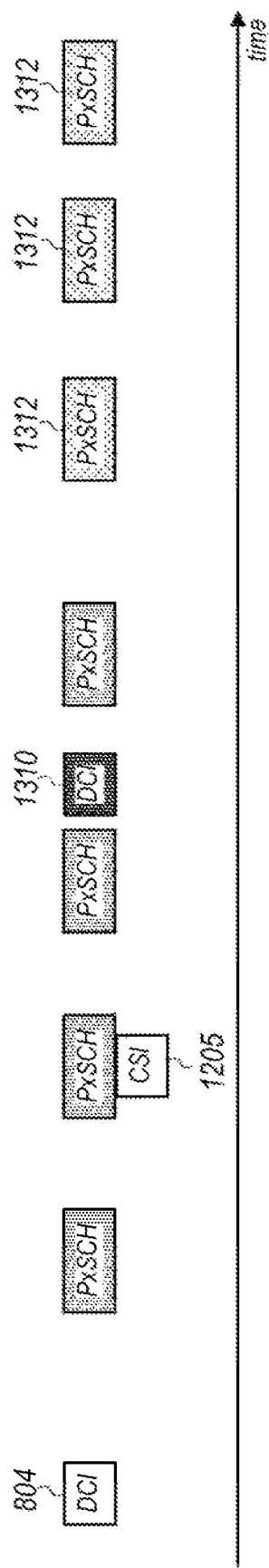

In some embodiments, the updated schedule may be based on measurements taken and/or reported during the period that the first schedule is in effect (e.g., during 807*a*). For example, the base station may update future parameters of UL/DL communications based on channel state information (CSI) feedback. Various parameters may be updated, including the time or number of communications scheduled, MCS, frequency domain location, MIMO parameters, etc. FIGS. 12 and 13 illustrate examples in which the schedule may be updated based on CSI feedback, according to some embodiments. The CSI may be periodic and/or a-periodic (e.g., A-CSI). The CSI may be transmitted at the same time as a PxSCH according to the first schedule or at a different time.

FIG. 12 illustrates an example in which the UE transmits CSI information (1205) to the base station during the period of time (807) that the first schedule is in effect, according to some embodiments. In this example, the base station does not update the schedule (e.g., no second DCI is transmitted). Thus, in this example, the first schedule is completed without modification.

FIG. 13 illustrates another example in which the UE transmits CSI information (1205) to the base station during the period of time (807) that the first schedule is in effect, according to some embodiments. In this example, the base station does update the schedule and sends an updating DCI (1310). Based on the updating DCI, the UE determines an updated schedule for remaining time (807*b*). For example, the updated schedule may include changes to communications (1312) during the remaining time.

In various embodiments, if the UE sends CSI feedback, the UE may expect change to transmission with limits on processing times. In some embodiments, the update may be provided and/or may be effective at a fixed time after CSI feedback. In some embodiments, the update may be at any time (e.g., subject to configured processing delays) and may be implemented with an override, e.g., as shown in FIG. 10.

In some embodiments, a bitmap in a second DCI modifying the first schedule may be used to indicate which transmissions any change in the updated schedule applies to. For example, if the updated schedule includes changing MIMO parameters, a bitmap may be used to indicate which communications should use the changed MIMO parameters and which communications should use the original MIMO parameters. In other words, such a bitmap may be used to indicate any type of parameter that may be updated for a subset of communications.

FIGS. 14-16—Implicit Indication of Updated Schedule

As noted above, the UE and the base station may determine the updated schedule implicitly, e.g., without an explicit indication of the updated schedule. The updated schedule may be determined based on information available to both the base station and the UE. The information available to both the base station and the UE may include configuration information (e.g., as discussed above regarding 802), information about the first schedule (e.g., as in 804/806), and/or any information shared between the base station and the UE prior to and/or during the period of time (807).

As shown in FIG. 14, the schedule may be updated based on conflicts between the first schedule and configuration information. For example, given that TDRA is based on RRC configuration, the first schedule (e.g., using one of a limited number of TDRA options) may not have the flexibility to avoid specific signals, e.g., invalid symbols or symbols that are defined in one direction (e.g., UL or DL) by TDM configuration that conflicts with a direction according to TDRA, etc. Thus, the updated schedule may resolve the conflict(s). For example, the updated schedule may avoid use of invalid symbols (1410) or symbols conflicting with a direction according to TDM configuration for communication with the UE. In other words, the UE may cancel specific TTIs that collide with such symbols.

In some embodiments, the UE may change (e.g., reverse) the direction of any symbol(s) of the first schedule to be consistent with configuration information. For example, a UL symbol may be changed to a DL symbol, or vice versa.

In some embodiments, the UE may adjust the first schedule to offset any transmission scheduled by the first schedule. For example, if the first schedule includes a communication during an invalid symbol, the UE and the base station may determine an updated schedule that moves the communication to a first valid symbol subsequent to the invalid symbol (e.g., an offset of +1 symbol). Any desired offset may be configured.

As shown in FIGS. 15-16, the schedule may be updated based on HARQ feedback, according to some embodiments. FIG. 15 illustrates an example in which repetition of an acknowledged transmission is skipped. For example, in the case of DL communication, if the UE sends ACK for a repeating transmission (e.g., PxSCH 2, which may be a PDSCH) and the base station is expected to send next packet(s) with NDI=0, e.g., repeating the payload data of the acknowledged transmission, e.g., PxSCH 3), then the schedule may be updated to skip any remaining repetitions. Thus, the base station does not send any further repetitions (e.g., skips relevant transmissions till next packet of NDI=1, e.g., PxSCH 4, which may also be a PDSCH). The UE may not attempt to receive during the skipped transmission. The updated schedule may continue with PxSCH 4 and 5.

FIG. 16 illustrates an example in which repetition of an acknowledged transmission is cancelled and a next transmission with new data (e.g., NDI=1) is advanced. In other words, transmissions may be shifted forward based on the acknowledgement. Similar to FIG. 15, the UE may acknowledge PxSCH 2. Thus, the PxSCH 3 may be cancelled. However, unlike FIG. 15, PxSCH 4 may be advanced, in the updated schedule, into the time reserved for PxSCH 3 in the first schedule. Similarly, PxSCH 5 may be advanced into the time reserved for PxSCH 4. Further, the updated schedule may include advancing an additional pending transmission into the time in the first schedule for PxSCH 5, according to some embodiments. The remaining communication time (1620) may be used for a next transmission in the queue for the corresponding direction (e.g., a next scheduled PxSCH, in the illustrated example). The next transmission may be a repetition (e.g., NDI=0) or may be new payload data (e.g., NDI=1).

In some embodiments, in association with sending an ACK the UE or BS may indicate a use for the time reserved for a repetition (or multiple repetitions) of the transmission acknowledged by the ACK. For example, the UE or BS may indicate a communication to be scheduled during that time.

In some embodiments, CSI feedback may be used as an implicit indication for updating the schedule. For example, based on a configuration known to both the UE and the base station, the UE may determine an updated schedule based on CSI feedback transmitted to the base station, e.g., without the base station sending a schedule update in response to the CSI feedback.

In some embodiments, information broadcast (or groupcast) by the base station may be used as an implicit indication to update the schedule. For example, an indication of a change in TDM configuration may lead to additional or different symbols conflicting with the first schedule. Thus, the UE may use the change in TDM configuration to determine an updated schedule.

Additional Information and Embodiments

It will be appreciated that various examples above and in the Figures may be illustrated with respect to UL or DL transmissions. These directions are exemplary only. An example shown/discussed in terms of PDSCH may similarly apply to PUSCH and vice versa, etc. For instance, the techniques described with respect to HARQ acknowledgement as an implicit indication (e.g., in FIGS. 15 and 16) may be applied to PUSCH transmissions acknowledged by a base station, according to some embodiments.

In a first set of embodiments, an apparatus, may comprise: a processor configured to cause a user equipment device (UE) to: establish communication with a base station; receive, from the base station, first downlink control information (DCI); determine, based on the first DCI, a first schedule of a plurality of communications over a period of time, wherein the plurality of communications includes uplink and/or downlink communications; perform a first communication of the plurality of communications according to the first schedule; receive, during the period of time, second DCI from the base station; determine, based on the second DCI, a modified schedule for a remainder of the period of time; and perform a second communication according to the modified schedule during the remainder of the period of time.

In some embodiments, the modified schedule may comprise a cancellation of a third communication of the plurality of communications scheduled during the remainder of the period of time according to the first schedule.

In some embodiments, the processor may be further configured to cause the UE to: transmit, to the base station, a negative acknowledgement of the third communication.

In some embodiments, the second communication may be scheduled by the first DCI and scheduling of the second communication is not modified by the second DCI.

In some embodiments, the third communication is scheduled by the first DCI for a first time during the remainder of the period of time; the second communication is scheduled by the second DCI for a second time during the remainder of the period of time, wherein the second time overlaps with the first time; and the processor is further configured to cause the UE to determine that the third communication is cancelled based on the second time overlapping with the first time.

In some embodiments, the second DCI may comprise a bitmap indicating, for respective transmissions of the plurality of communications during the remainder of the period of time, whether the respective transmission is cancelled, wherein the modified schedule is determined based on the bitmap.

In some embodiments, the processor may be further configured to cause the UE to: determine a processing delay, wherein the modified schedule is determined further based on the processing delay such that the second DCI does not modify any communication of the first schedule within a duration of the processing delay from a time that the second DCI is received.

In some embodiments, the modified schedule may comprise a cancellation of all communications of the plurality of communications during the remainder of the period of time.

In some embodiments, the processor may be further configured to cause the UE to: perform an acknowledgement communication with the base station associated with the second communication, wherein the acknowledgement communication is performed according to the first schedule.

In some embodiments, the processor may be further configured to cause the UE to: perform an acknowledgement communication with the base station associated with the second communication, wherein the acknowledgement communication is performed according to the modified schedule.

In a second set of embodiments, a user equipment device (UE), may comprise: a radio; and a processor operably connected to the radio and configured to cause the UE to: establish communication with a base station; receive, from the base station, configuration information; receive, from the base station, first downlink control information (DCI); determine, based on the first DCI, a first schedule of a plurality of communications over a period of time, wherein the plurality of communications includes uplink and/or downlink communications; perform a first communication according to the first schedule during a first portion of the period of time; determine an updated schedule, different from the first schedule, based on the configuration information; and perform communication with the base station according to the updated schedule for a remainder of the period of time subsequent to the first portion of the period of time.

In some embodiments, the processor may be further configured to cause the UE to: determine that a first communication of the plurality of communications conflicts with the configuration information, wherein the updated schedule is determined based on the determination that the first communication conflicts with the configuration information and the updated schedule comprises: a cancellation of the first communication in response to the determination that the first communication conflicts with the configuration information, wherein a remainder of the plurality of communications is not cancelled.

In some embodiments, the updated schedule may be based on uplink control information (UCI) transmitted to the base station in response to the first communication.

In some embodiments, the UCI may be a positive acknowledgement of the first communication and the updated schedule comprises skipping a second communication of payload data of the first communication.

In some embodiments, the updated schedule may comprise advancing a third communication comprising different payload data to a time of the second communication.

In a third set of embodiments, an apparatus may comprise a processor configured to cause a base station to: establish communication with a user equipment device (UE); determine, for the UE, a first schedule of a plurality of communications over a period of time, wherein the plurality of communications includes uplink and/or downlink communications; transmit, to the UE, first downlink control information (DCI) indicating the first schedule; perform a first communication of the plurality of communications according to the first schedule; determine, during the period of time, an updated schedule; and perform communication with the UE according to the updated schedule.

In some embodiments, the processor may be further configured to cause the base station to: transmit, to the UE, second DCI indicating the updated schedule.

In some embodiments, the first schedule may apply to a first carrier and the updated schedule applies to the first carrier, wherein the second DCI is transmitted on a second carrier different from the first carrier.

In some embodiments, the processor may be further configured to cause the base station to: receive, from the UE, channel state information (CSI), wherein the updated schedule is based on the CSI.

In some embodiments, the updated schedule may comprise a change in one or more of: modulation and coding scheme; frequency domain location; or multiple-input multiple-output parameters.

In various embodiments, various combinations of the embodiments described above may be combined together.

Yet another exemplary embodiment may include a method, comprising: by a wireless device: performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Any of the methods described herein for operating a user equipment (UE) may be the basis of a corresponding method for operating a base station, by interpreting each message/signal X received by the UE in the DL as message/signal X transmitted by the base station, and each message/signal Y transmitted in the UL by the UE as a message/signal Y received by the base station. Moreover, a method described with respect to a base station may be interpreted as a method for a UE in a similar manner.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   memory; and
   a processor, coupled to the memory, configured to cause a user equipment device (UE) to:
   establish communication with a base station;
   receive, from the base station, first downlink control information (DCI);
   determine, based on the first DCI, a first schedule of a plurality of communications over a period of time, wherein the plurality of communications includes uplink and/or downlink communications;
   perform a first communication of the plurality of communications according to the first schedule;
   receive, during the period of time, second DCI from the base station;
   determine, based on the second DCI, a modified schedule for a remainder of the period of time; and
   perform a second communication according to the modified schedule during the remainder of the period of time, wherein the modified schedule comprises a cancellation of a third communication of the plurality of communications scheduled during the remainder of the period of time according to the first schedule.

2. The apparatus of claim 1, further configured to:
   transmit, to the base station, a negative acknowledgement of the third communication.

3. The apparatus of claim 1, wherein the second communication is scheduled by the first DCI and scheduling of the second communication is not modified by the second DCI.

4. The apparatus of claim 1, wherein:
   the third communication is scheduled by the first DCI for a first time during the remainder of the period of time;

the second communication is scheduled by the second DCI for a second time during the remainder of the period of time, wherein the second time overlaps with the first time; and the apparatus is further configured to to determine that the third communication is cancelled based on the second time overlapping with the first time.

5. The apparatus of claim 1, wherein the second DCI comprises a bitmap indicating, for respective transmissions of the plurality of communications during the remainder of the period of time, whether the respective transmission is cancelled, wherein the modified schedule is determined based on the bitmap.

6. The apparatus of claim 1, further configured to:
determine a processing delay, wherein the modified schedule is determined further based on the processing delay such that the second DCI does not modify any communication of the first schedule within a duration of the processing delay from a time that the second DCI is received.

7. The apparatus of claim 1, wherein the modified schedule comprises a cancellation of all communications of the plurality of communications during the remainder of the period of time.

8. The apparatus of claim 1, further configured to:
perform an acknowledgement communication with the base station associated with the second communication, wherein the acknowledgement communication is performed according to the first schedule.

9. The apparatus of claim 1, further configured to:
perform an acknowledgement communication with the base station associated with the second communication, wherein the acknowledgement communication is performed according to the modified schedule.

10. A user equipment device (UE), comprising:
a radio; and
a processor operably connected to the radio and configured to cause the UE to:
establish communication with a base station;
receive, from the base station, configuration information;
receive, from the base station, first downlink control information (DCI);
determine, based on the first DCI, a first schedule of a plurality of communications over a period of time, wherein the plurality of communications includes uplink and/or downlink communications;
perform a first communication according to the first schedule during a first portion of the period of time;
determine that a first communication of the plurality of communications conflicts with the configuration information;
determine an updated schedule, different from the first schedule, based on the configuration information, wherein the updated schedule is determined based on the determination that the first communication conflicts with the configuration information and the updated schedule comprises a cancellation of the first communication in response to the determination that the first communication conflicts with the configuration information, wherein a remainder of the plurality of communications is not cancelled; and
perform communication with the base station according to the updated schedule for a remainder of the period of time subsequent to the first portion of the period of time.

11. The UE of claim 10, wherein the updated schedule is based on uplink control information (UCI) transmitted to the base station in response to the first communication.

12. The UE of claim 11, wherein the UCI is a positive acknowledgement of the first communication and the updated schedule comprises skipping a second communication of payload data of the first communication.

13. The UE of claim 12, wherein the updated schedule comprises advancing a third communication comprising different payload data to a time of the second communication.

14. An apparatus, comprising:
a processor configured to cause a base station to:
establish communication with a user equipment device (UE);
determine, for the UE, a first schedule of a plurality of communications over a period of time, wherein the plurality of communications includes uplink and/or downlink communications;
transmit, to the UE, first downlink control information (DCI) indicating the first schedule;
perform a first communication of the plurality of communications according to the first schedule;
determine, during the period of time, an updated schedule, wherein the updated schedule comprises a cancellation of a second communication of the plurality of communications scheduled during a remainder of the period of time according to the first schedule; and
perform communication with the UE according to the updated schedule.

15. The apparatus of claim 14, wherein the processor is further configured to cause the base station to:
transmit, to the UE, second DCI indicating the updated schedule.

16. The apparatus of claim 15, wherein the first schedule applies to a first carrier and the updated schedule applies to the first carrier, wherein the second DCI is transmitted on a second carrier different from the first carrier.

17. The apparatus of claim 15, wherein the processor is further configured to cause the base station to:
receive, from the UE, channel state information (CSI), wherein the updated schedule is based on the CSI.

18. The apparatus of claim 17, wherein the updated schedule comprises a change in one or more of:
modulation and coding scheme;
frequency domain location; or
multiple-input multiple-output parameters.

* * * * *